United States Patent
Gershenov

(10) Patent No.: US 11,533,888 B2
(45) Date of Patent: Dec. 27, 2022

(54) FELINE SHELTER

(71) Applicant: Lena Gershenov, Armonk, NY (US)

(72) Inventor: Lena Gershenov, Armonk, NY (US)

(73) Assignee: Petsncharge LLC, Armonk, NY (US)

( * ) Notice: Subject to any disclaimer, the term of this patent is extended or adjusted under 35 U.S.C. 154(b) by 79 days.

(21) Appl. No.: 15/929,941

(22) Filed: May 29, 2020

(65) Prior Publication Data

US 2021/0368734 A1    Dec. 2, 2021

(51) Int. Cl.
| | | |
|---|---|---|
| *A01K 1/03* | (2006.01) | |
| *E06B 7/32* | (2006.01) | |
| *A01K 1/00* | (2006.01) | |

(52) U.S. Cl.
CPC ............ *A01K 1/033* (2013.01); *A01K 1/0064* (2013.01); *E06B 7/32* (2013.01)

(58) Field of Classification Search
CPC .......... A01K 1/033; A01K 1/03; A01K 1/031; A01K 1/0064; A01K 1/02; A01K 15/02; E06B 7/32
See application file for complete search history.

(56) References Cited

U.S. PATENT DOCUMENTS

| | | | |
|---|---|---|---|
| 920,975 A * | 5/1909 | Minion | A01K 1/033 119/482 |
| 5,092,277 A | 3/1992 | Baillie et al. | |
| 5,133,291 A | 7/1992 | Justice | |
| 5,964,189 A | 10/1999 | Northrop et al. | |
| 5,964,190 A | 10/1999 | Willinger et al. | |
| 6,062,171 A | 5/2000 | Tominaga | |
| 6,886,495 B1 | 5/2005 | Madden et al. | |
| 6,971,333 B1 | 12/2005 | Hearrell | |
| 7,578,264 B2 | 8/2009 | Guard | |
| 7,584,720 B1 * | 9/2009 | Jackson | A01K 1/03 119/472 |
| 8,132,537 B2 * | 3/2012 | Trunnell | A01K 1/033 119/496 |
| 8,640,652 B2 | 2/2014 | Callari | |
| 8,881,680 B1 * | 11/2014 | Woody | A01K 1/0114 119/165 |
| 9,326,483 B2 | 5/2016 | Hall | |
| 9,370,165 B2 * | 6/2016 | de Bien | A01K 1/0245 |
| 9,585,363 B2 | 3/2017 | Casto | |

(Continued)

FOREIGN PATENT DOCUMENTS

WO    WO-2013018070 A1 *    2/2013           G06K 9/6282

OTHER PUBLICATIONS

"Scribed." Dictionary.com, https://www.dictionary.com/browse/scribed. Accessed Dec. 9, 2021. (Year: 2021).*

*Primary Examiner* — Peter M Poon
*Assistant Examiner* — Carly W. Lynch
(74) *Attorney, Agent, or Firm* — Dunlap Bennett & Ludwig, PLLC

(57) ABSTRACT

A durable feral cat shelter adapted to be inviting to feral cats year-round by having two entrances/exits for each compartment or sub-compartment, wherein each entrance/exit has a conduit of a predefined cross-section that protrudes a predefined length from the body of the shelter, thereby inviting feral cats while deterring most would be predators of the feral cats. Two or more feral cat shelters can be connected by a coupler that allows access to the connected plurality of feral cat shelters.

6 Claims, 6 Drawing Sheets

(56) References Cited

U.S. PATENT DOCUMENTS

| | | | |
|---|---|---|---|
| 9,961,875 B2* | 5/2018 | Goddard / Imel | A01K 1/035 |
| 9,992,980 B2 | 6/2018 | Tominaga et al. | |
| 10,412,926 B2 | 9/2019 | Chen | |
| 2003/0168017 A1 | 9/2003 | Perelli et al. | |
| 2007/0131174 A1 | 6/2007 | Coggins | |
| 2008/0245313 A1* | 10/2008 | Jakubowski | A01K 1/034 |
| | | | 119/497 |
| 2011/0146583 A1 | 6/2011 | Larson et al. | |
| 2013/0220230 A1 | 8/2013 | Hazer | |
| 2013/0239902 A1 | 9/2013 | Venne | |
| 2014/0230746 A1 | 8/2014 | Chapman | |
| 2016/0338317 A1 | 11/2016 | Stroud et al. | |
| 2021/0051918 A1* | 2/2021 | Karlsson | A01K 1/0047 |

\* cited by examiner

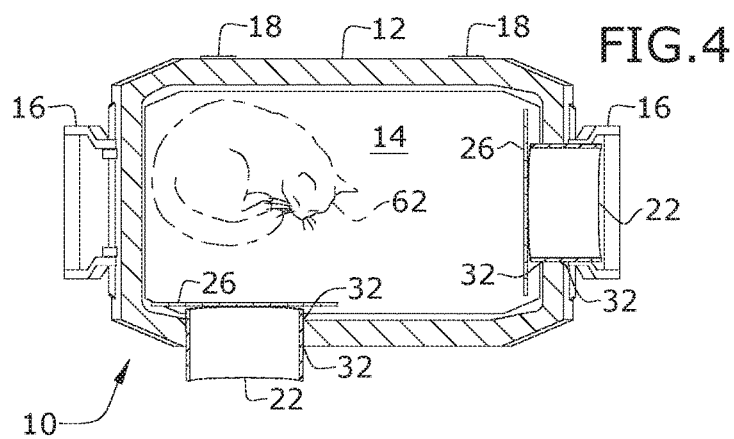
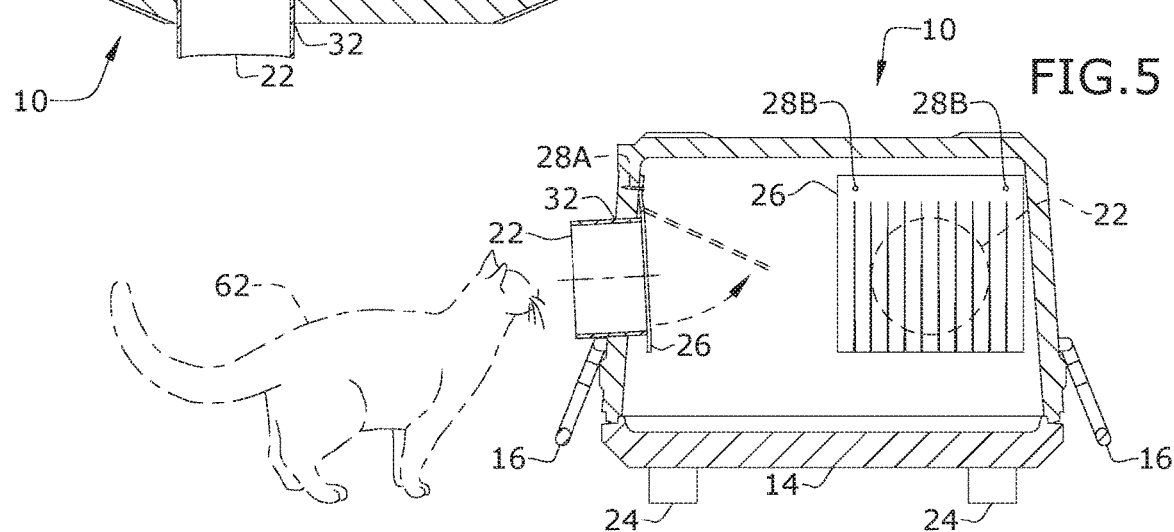
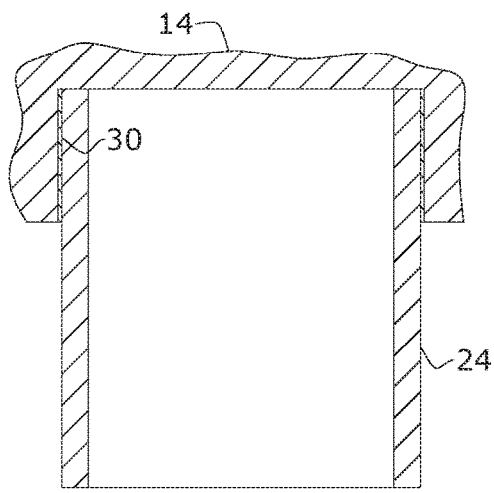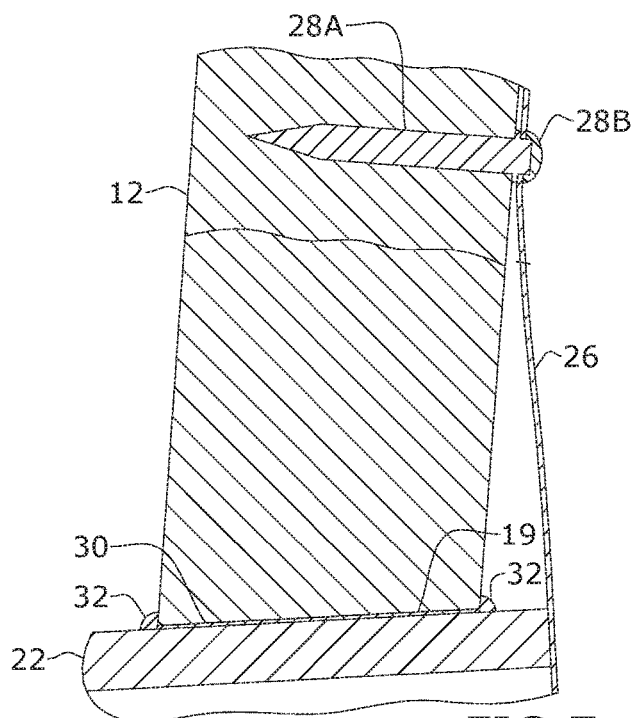

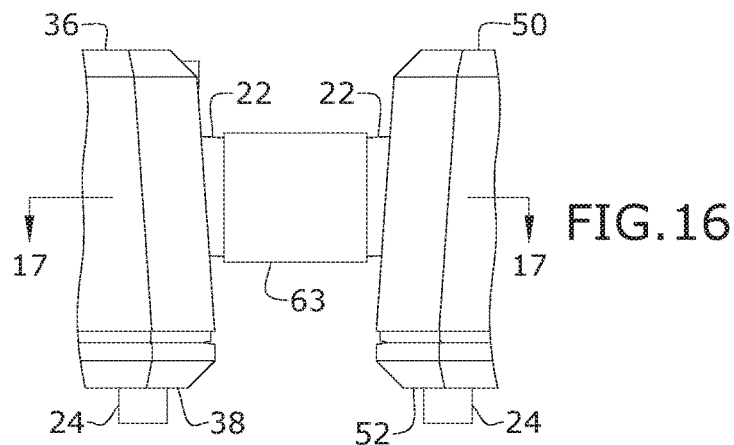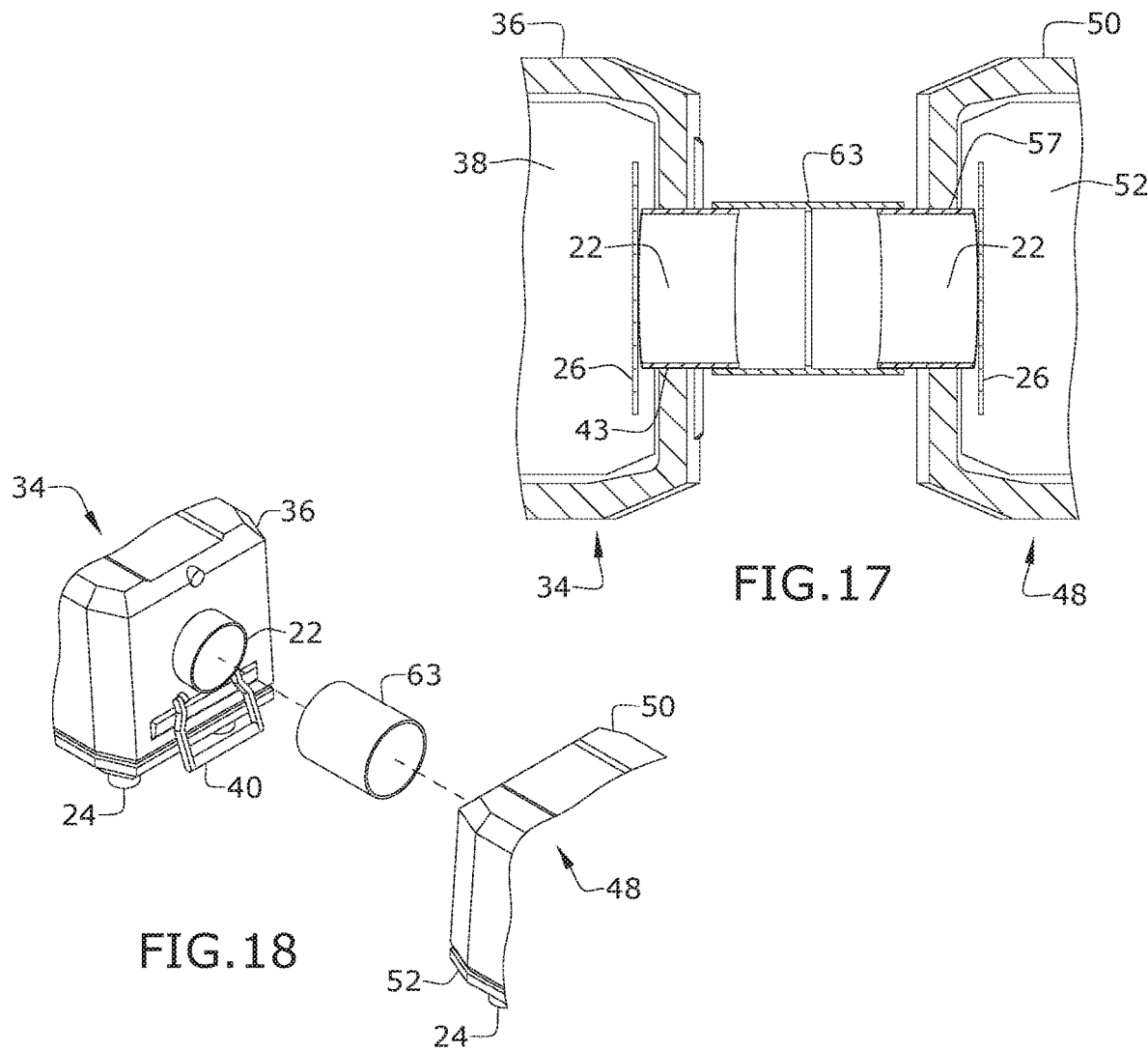

FELINE SHELTER

BACKGROUND OF THE INVENTION

The present invention relates to animal shelters and, more particularly, to a feline shelter that is modular and specifically adapted for feral cats.

A cat can be a house cat, a farm cat, or a feral cat, the latter ranges freely outside and avoids human contact, and so it is not difficult to appreciate that feral cats will not accept any shelter, just because it is available; the shelter needs to be specifically adapted to be inviting to feral cats.

Accordingly, current pet shelters have the following disadvantages for sheltering feral cats for extended stays:

Average pet shelters are not attractive, wear and tear easily, are not easy to clean, and need to be frequently replaced;

Current shelters are not adapted to convert from summer to winter;

Most current shelters do not have two doors;

If a door flap is attached and it is solid and non-removable, most feral cats will not push through such entrance doors—furthermore, such an arrangement makes the inside of the shelter too hot in warmer months;

Current shelters have entrances that are either too small for many cats or too big, thereby allowing predators easy access, and so feral cats will never enter such "shelters" for fear of becoming trapped;

Most current shelters do not have cylindrically shaped doors, which is important as cylindrical is like a cat's body;

Current shelters do not stay dry. The doors are not pitched, allowing water to run off, and the lid allows water to seep under the lid. Raising the shelter off the ground also aids in keeping dry, as well as placing doors high enough that water will not run inside. Seamless and sealed construction further aids in keeping moisture out. Beveled top (container) further helps pitch water away from the structure;

Current shelters are not adapted to stay cool outside in warm weather—i.e., removable flaps;

Many current shelters are built with toxic materials the can harm cats if ingested and degrade/release fumes at temperatures above 100 degrees or otherwise being exposed to outdoor elements, making them not suitable for year-round use;

Current shelters are difficult to clean/restock after extended use by a feral cat; and Current shelters are difficult to access and check for kittens.

In other words, feral cats either refuse to use current shelters or can take a long time to use them, thus exposing feral cats to the vagaries of living outside, frustrating the purpose of the shelter. And when they do start to use prior art shelter, the shelters tend to become soggy, flooded, and uninhabitable.

As can be seen, there is a need for a feline shelter that is modular and specifically adapted for feral cats. Modularity allows for flexibility and adaptability to each individual colony's needs based on how many cats are in the colony and if they prefer to share space.

The present invention embodies feral cat shelters adapted to be weather-proof and convert easily between winter and summer outdoor environments; for instance, the entrances provides removable flaps to keep out a draft in cold weather yet are removable for warmer weather, preventing buildup of excessive internal temperatures. The feral cat shelters are adapted to be cat-friendly with two entrances/exists, each dimensioned and adapted to accommodate all sized cats yet also designed to keep most dogs/predators out. The entrances/exits are also pitched downward to keep out the elements. The feral cat shelter provides legs to keep it off the ground, for staying dry.

The present invention also embodies double units, with a divider scribed for fitting irregular surfaces by contouring abutting surfaces to fit snuggly without gaps. The divider is scribed to the bottom/lid to prevent small kittens from getting stuck underneath. Double units also allow colony cats to utilize it if there is a dominant cat residing in one half. The entrances/exits provide pipe doors, which the inventor through years of first-hand experience has determined feral cats find inviting. The pipe also protects and completely seals the foam insulation from either becoming wet or a cat coming in contact. Furthermore, the pipe provides a safety deterrent from dogs or other predators that would not be able to reach in. The pipe is dimensioned to be long enough to keep most dogs/predators out and still be inviting to cat. All materials of the cat shelter are selected for temperature stability and being toxicity free at varying temperatures. The present invention is also adapted to be sent as easy to assemble kits when shipping is required.

SUMMARY OF THE INVENTION

In one aspect of the present invention, a feral cat shelter includes the following: a shelter body defining a compartment; two or more openings (for doubles unit) in the shelter body communicating to the compartment; a conduit protruding from each opening a protruding distance between two to three inches; and the conduit having an inner diameter between five and a half and six and half inches; and a divider separating the compartment into two sub-compartments, each sub-compartment communicating to at least two openings.

In another aspect of the present invention, a feral cat shelter includes the following: a shelter body defining a compartment; two or more openings in the shelter body communicating to the compartment; a conduit protruding from each opening a protruding distance between two to three inches; the conduit having an inner diameter between five and a half and six and half inches; each conduit pitched downward supporting surface on which the shelter body is supported; a plurality of weather flaps may be removably attached with marine screws to the inside of the container (sealed prior to installation) and snaps for easy installation and removal without opening the shelter; and a plurality of legs along an outer portion of the base, the plurality of legs support the base in the close condition.

In yet another aspect of the present invention, method of providing a plurality of coupled feral cat shelters includes the following: providing two or more of the above-mentioned feral cat shelters and interconnecting one of the two or more openings to another one of the two or more openings of adjacent feral cat shelters.

These and other features, aspects and advantages of the present invention will become better understood with reference to the following drawings, description and claims.

BRIEF DESCRIPTION OF THE DRAWINGS

FIG. 4 is a section view of an exemplary embodiment of the present invention, taken along line 4-4 from FIG. 2;

FIG. 5 is a section view of an exemplary embodiment of the present invention, taken along line 5-5 from FIG. 3;

FIG. 6 is a detailed section view of an exemplary embodiment of the present invention, illustrating a leg 24 to base 14 connection;

FIG. 7 is a detailed section view of an exemplary embodiment of the present invention, illustrating an opening;

FIG. 16 is a partial side elevation view of an exemplary embodiment of the present invention, illustrating two shelters coupled together, taken along line 16-16 from FIG. 14;

FIG. 17 is a section view of an exemplary embodiment of the present invention, taken along line 17-17 from FIG. 16; and FIG. 18 is an exploded view of exemplary embodiments of the present invention, illustrating two shelters and the coupler.

DETAILED DESCRIPTION OF THE INVENTION

Figure 1:
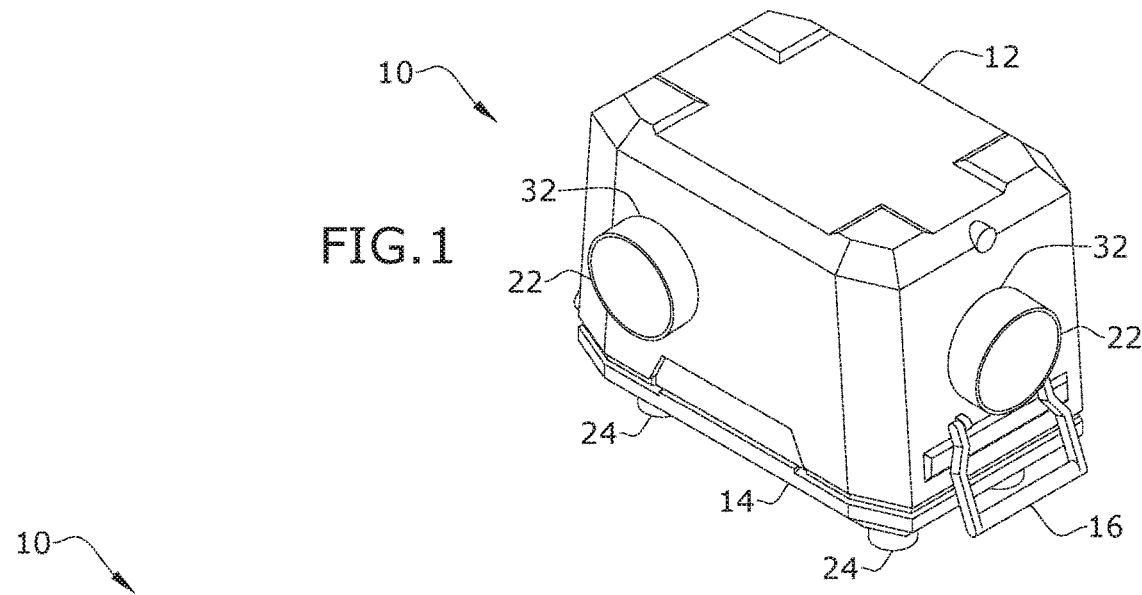
FIG. 1 is a perspective view of an exemplary embodiment of the present invention.
Figure 2:
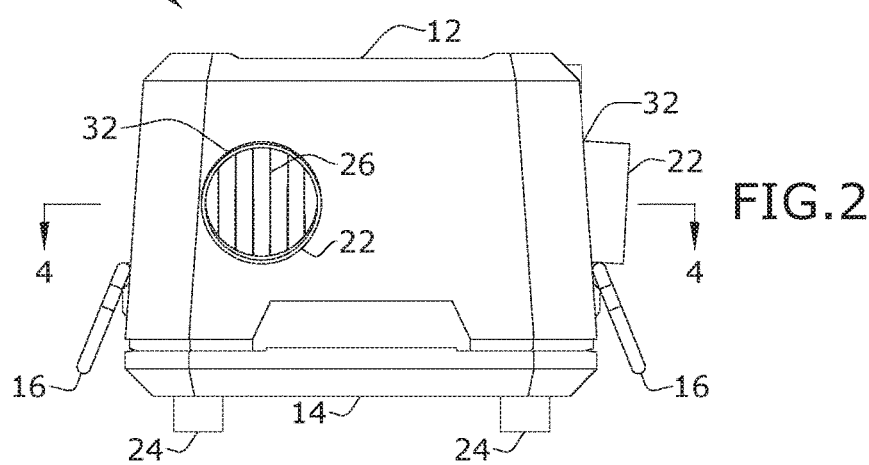
FIG. 2 is a front perspective view of an exemplary embodiment of the present invention.
Figure 3:
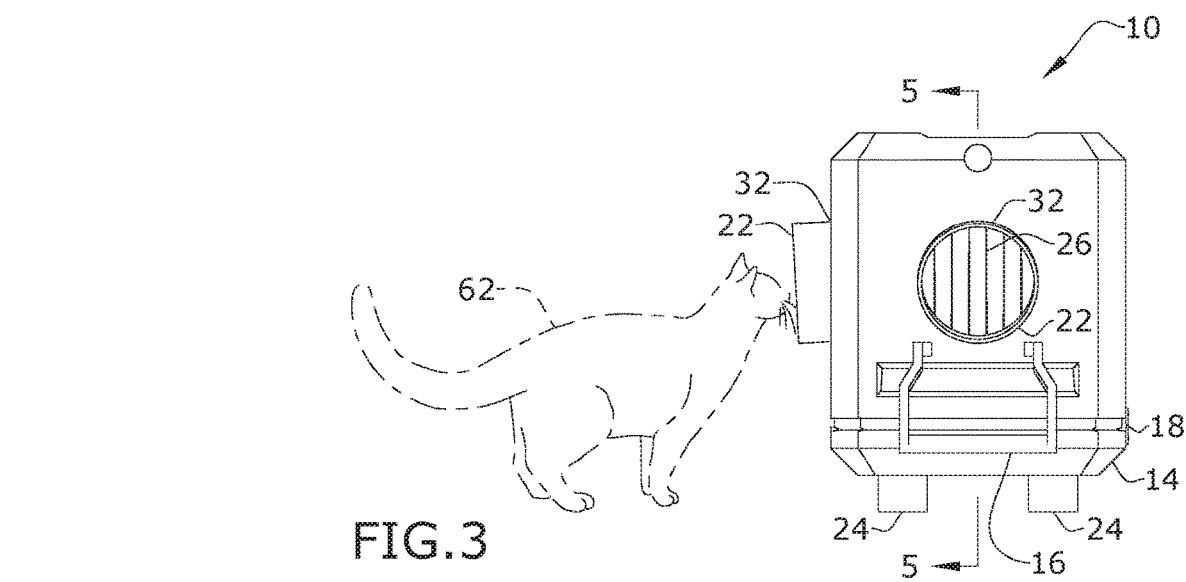
FIG. 3 is a side elevation view of an exemplary embodiment of the present invention.
Figure 8:
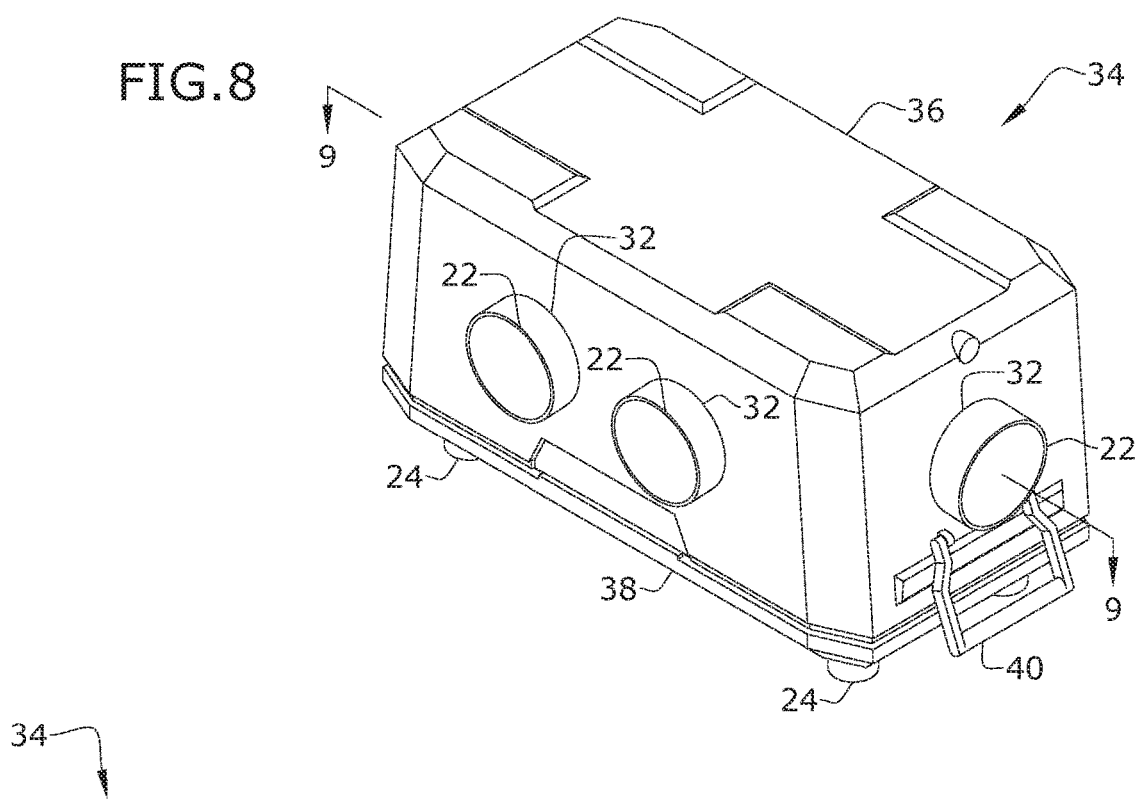
FIG. 8 is a perspective view of an exemplary embodiment of a double unit of the present invention.
Figure 9:
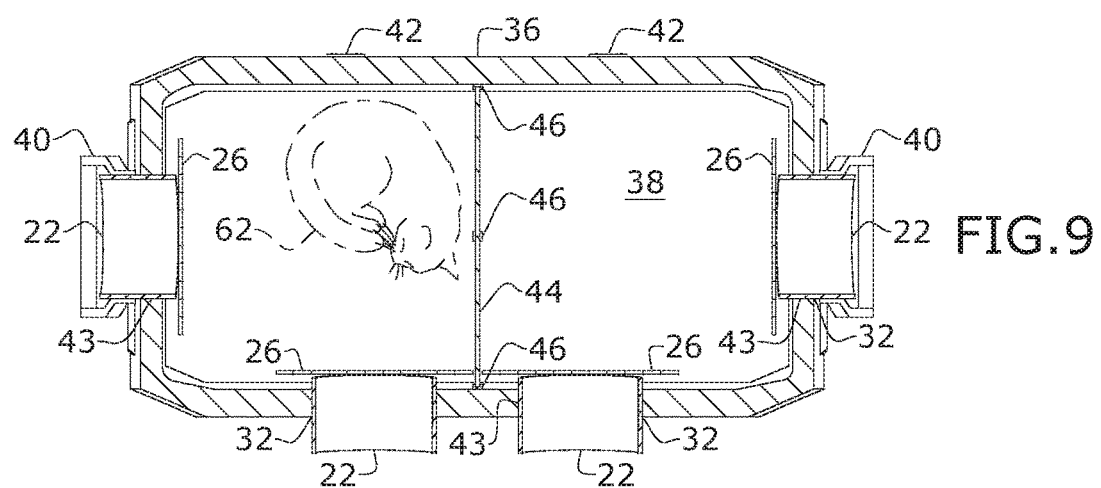
FIG. 9 is a section view of an exemplary embodiment of the present invention, taken along line 9-9 from FIG. 8.
Figure 10:
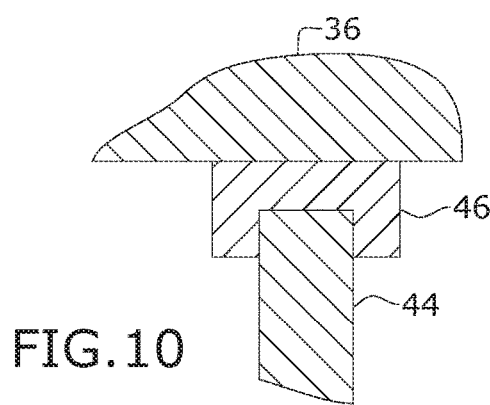
FIG. 10 is a detailed section view of an exemplary embodiment of the present invention, illustrating a divider 44 and an operatively associated support 46.
Figure 11:
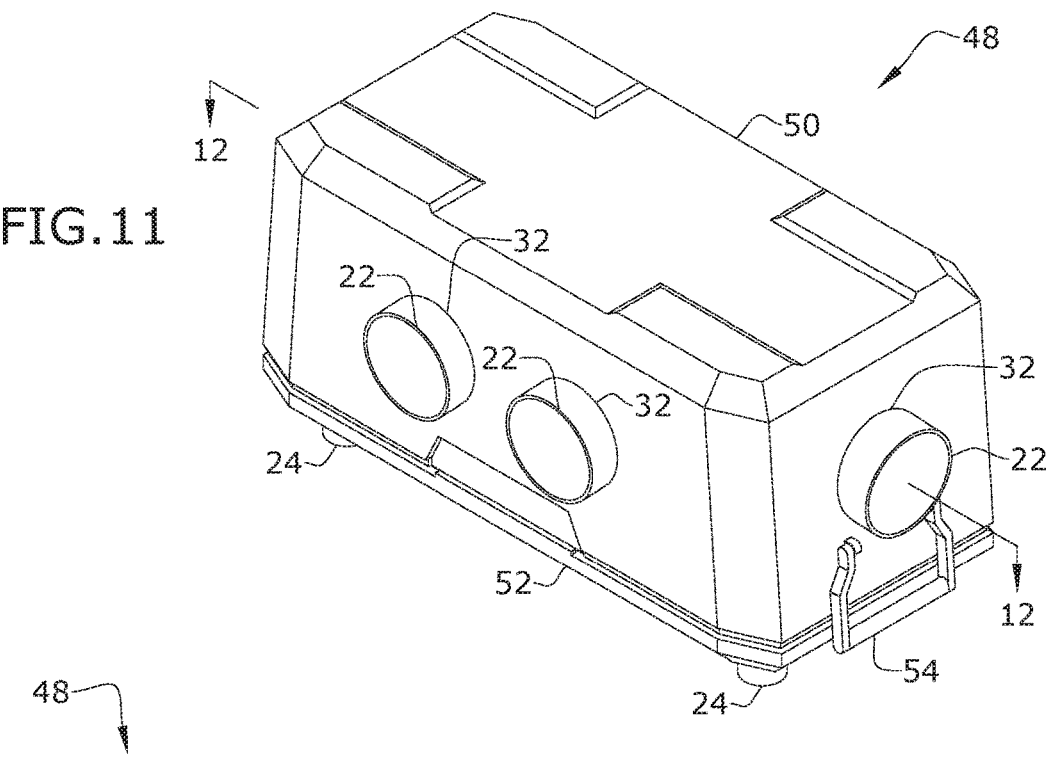
FIG. 11 is a perspective view of an exemplary embodiment of a present invention.
Figure 12:
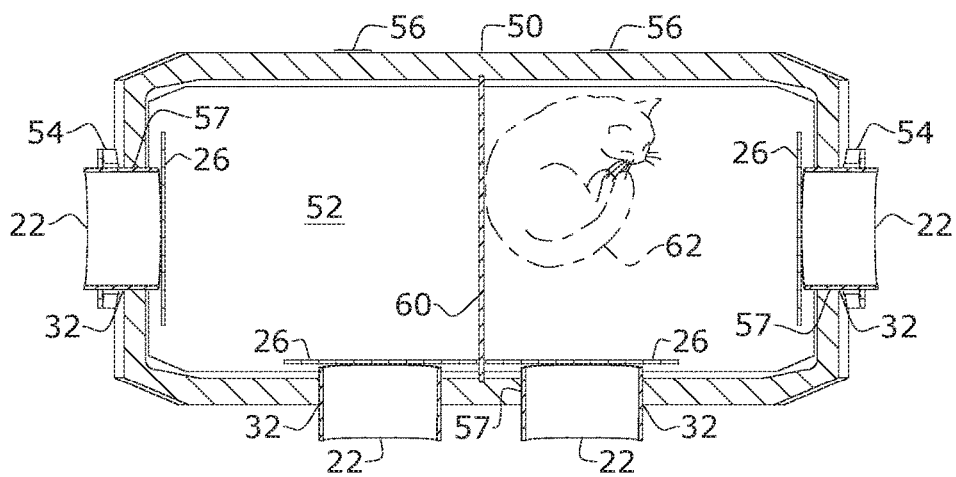
FIG. 12 is a section view of an exemplary embodiment of the present invention, taken along line 12-12 from FIG. 11.
Figure 13:
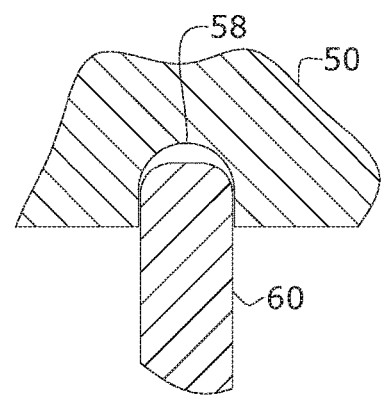
FIG. 13 is a detailed section view of an exemplary embodiment of the present invention, illustrating a divider 60 and an operatively associated channel 58.
Figure 14:
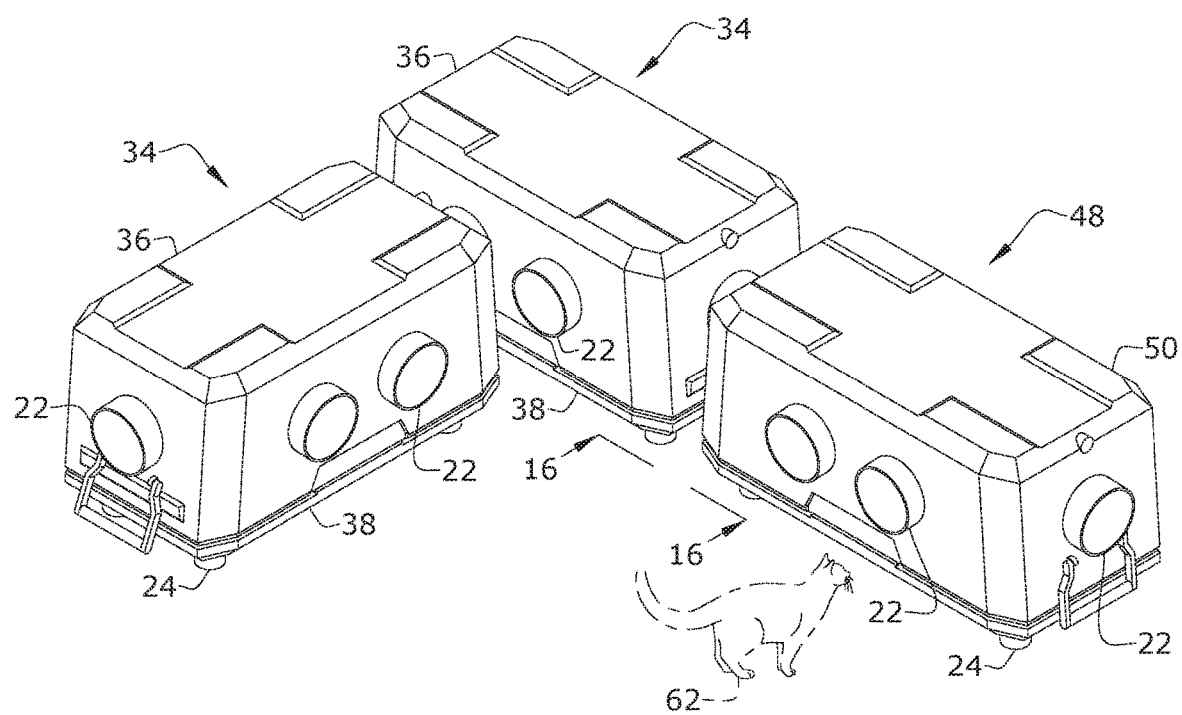
FIG. 14 is a perspective view of an exemplary embodiment of the present invention, shown in a combined configuration for a colony of feral cats 62.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a feral cat shelter adapted to be inviting to feral cats by having two entrances/exits for each compartment or sub-compartment, wherein each entrance/exit has a conduit of a predefined cross-section that protrudes a predefined length from the body of the shelter, thereby inviting feral cats but intimidating most would be predators of the feral cats. Two or more feral cat shelters can be connected by a coupler 63 that allows access to the connected plurality of feral cat shelters. The coupler may be six inches in length, have an inner diameter of 6⅝ inches. The coupler 63 may snugly attach via pressure/socket fits to the conduits 22.

Referring to FIGS. 1 through 18, the present invention may include a feral cat shelter 10, 34, or 48 having various dimensioned shelter bodies 12, 36, or 50, respectively. The shelter bodies 12, 36, or 50 may define a main compartment having a volume of 70, 120, 150 quarts, though it should be understood that the shelter body 12, 36, or 50 can be any volume as long as the feral cat shelter 10, 34, or 48 functions in accordance with the disclosure herein. An inner surface of the compartment may be white as the inventor has discovered that cats consider it more inviting and are more likely to go into the shelter if the inside is light.

Figure 15:
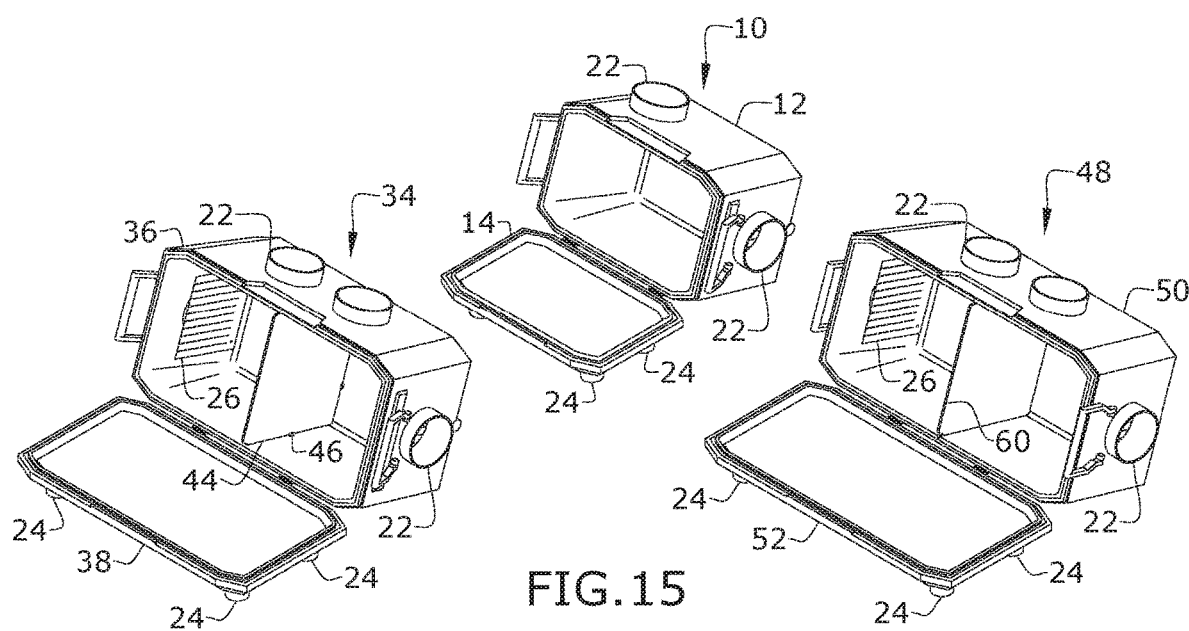
FIG. 15 is a perspective view of exemplary embodiments of the present invention, shown in open conditions.

Each feral cat shelter 10, 34, or 48 may have a base 14, 38, or 52 closing off a peripheral opening defined by a periphery of the shelter body 12, 36, or 50, respectively. Each base 14, 38, or 52 may be pivotably attached to the respective shelter body 12, 36, or 50 by a pivot attachment 18, 42, of 56 so that each base 14, 38, or 52 is moveable between a closed condition and an open condition, as illustrated in FIG. 15. Each base 14, 38, or 52 may have legs 24 for maintaining the base 14, 38, or 52 spaced apart from a supporting surface, such as the ground when each base 14, 38, or 52 is in the closed condition and the feral cat shelter 10, 34, or 48 are in an operative condition. The operative condition enables feral cats 62 to shelter from the elements in the feral cat shelter 10, 34, or 48, as illustrated in FIGS. 3-5, 9 and 12, wherein the base 14, 38, or 52 in the closed condition is the "floor". Such an arrangement facilitates cleaning and restocking of the main compartment. In other words, the base 14, 38, or 52 is the lid that is "upside down" compared to other shelters—preventing water from leaking inside and makes cleaning easier (as a use can just lift the lid/base 14, 38, or 52 and dump the bottom).

The base 14, 38, or 52 may have a cup holder (not shown) built therein, operable in the operative condition. Each shelter body 12, 36, or 50 may have handles 16, 40, or 54, respectively, for moving the associated feral cat shelter 10, 34, or 48.

At least two openings 19, 43, or 57 may be cut out of each shelter body 12, 36, or 50, respectively. A conduit 22 may be fluidly coupled to each opening 19, 43, or 57; in certain embodiments, a sealing system 30 and 32 may operatively associate an outer circumference of each conduit 22 to a periphery of each opening 19, 43, or 57, wherein the sealing system 30 and 32 may include marine adhesive or the like at the periphery-circumference interface and phenoseal caulking adhesive or the like along the edges. The conduits 22 may be hammered in with a rubber mallet and sealed in place with phenoseal adhesive caulk.

Each conduit may be pitched or angled toward the supporting surface in the operative condition to help keep water/rain/elements out of the conduits 22. Note, the sealing system 30 and 32 may also, separately, be used to attach the legs 24 to the relevant base 14, 38, or 52. Adjacent an proximal end of each conduit 22, a plurality of weather flaps 26 may be removably mounted by a connector 28 in such a way that the plurality of weather flaps 26 separately pivot inwardly into the main compartment. The connector 28 also enables the weather flaps 26 to be easily removed or connected for conversion for different seasons/climates. Each conduit 22 may have an inner diameter of between five and a half and six and a half inches and protrude a length of two to three from an outer surface of the shelter body 12, 36, or 50 so as to be inviting to cats yet intimidating for predators (as the latter would not want to get trapped in the conduit 22). The overall length of the conduit 22 may be between four and five inches. An upper portion of the conduit 22 may protrude only about a quarter of an inch within the compartment, while a lower portion of the conduit may protrude within the compartment about half an inch to allow for the conduit's 22 pitched condition.

Some shelter bodies 36 and 50 may have at least one divider 44 or 60, respectively, that divide the main compartment into two sub-components, wherein each subcomponent has at least two openings 43 or 57. The divider 44 or 60 may connect to an inner surface of the relevant shelter body 36 or 50 by way of supports 46 or built-in channels 58 for the divider 60 to slide into, respectively. Each divider 44 and 60 may be made from cutting board material.

All materials selected for the feral cat shelters 10, 34, and 48 are selected for temperature stability and being toxicity-free at varying temperatures. In certain embodiments, the material choices may include the following. Choosing the items used and how they are put together included an insight into the psychology of cats. The biggest problem with most shelters on the market is that they are not designed with either the Cats or Human caretakers most essential needs that would make them instantly used by the cats, easy to convert from warm to cold weather, easy to clean and restock with fresh bedding and most important Dry. Another feature is they should be raised off the ground (legs) helping keep out the elements (most shelters require blocks to achieve this separately-more efficient as a complete unit).

6" Inside Diameter pipe is most important-Taking into account the average spread of a cat's whiskers is usually less than 6" and that cats use their whiskers to determine if they will fit. The next was to decide on length of pipe. Measure a cats belly length from under arms to in front of hip and most are around 8"-4"(half) allows the front legs to comfortably reach into the pipe/shelter with enough room that the back legs can follow unhindered. With many cats to help me I varied between 5"-4" and through much observation found 4" was ideal. The 6" pipe is cut to 4" and then all the edges are sanded. Another feature of the 4" length is that when installed dogs cannot reach in which is added safety to the cats (tested with dogs by placing treats inside the shelter). All shelters should have 2 Doors/Pipe, so a cat can never be trapped within. All shelters built whether they are single units (2 doors only) or double units (2 doors at each side with a middle divider acting as 2 shelters in one) the same build principles apply. Minimum 6" down from top (actually bottom) of cooler to outside top of pipe and at least 3" apart if a double unit from outside edge to outside edge of pipe to allow for divider and flap installation. These are the minimum and can be vary depending on climate or colony needs. The second exit is placed under the handle area. This is lower and can be easier for smaller cats or kittens. Leaving the handles in place allows the units to be moved easier and can act as stabilizers since the coolers are flipped over and the handles are in contact with the ground. The handles can also be staked or chained for added security. When installing the pipe, pitching it downward also helps water runoff.

Flaps: keeping out drafts helps keep the interior warm. Figuring out a flap system that is both easy to convert seasonally, that cats will readily go through, nontoxic, and out of a material that cats/kittens wont chew is essential. 0.45 ml pond liner was the perfect material. A 10"×10" square, snaps are placed 8" apart, 1" down from top and 1" from either side. Slits are cut from bottom from ½"-1" apart up to 2" from top. When cats can see through the fringe and the white interior of the shelter is more inviting. As evidenced by the inventor who placed 300 shelters in use, where approximately half were placed with flaps installed, approximately a ¼ with no flaps at first (installed after cats began using), and approximately a ¼ with one flap on (installing additional after cats began using) all had similar results—cats used the shelters immediately after placement. This is so important to be able to install and place especially in colder months without worry the cats will be put off by the flaps. Using a 10"×10" even though the pipe is 6" helps the insulated properties and the movement of the fringe.

Feet: It is important to raise shelters off the groundwater can run under and away easily incorporating this feature into the shelter makes it complete. Using a Cooler with cup holders is the perfect vehicle to install these feet. Trying several materials, 2" couplings that are 3-4" long was stable, strong and optimum height for urban settings (for rural application a longer coupling to accommodate terrain and flora-4-6"). Several adhesives and epoxies were tried-only Flexible Marine Adhesive formed a strong and stable bond in temperature fluxes. A bead of Adhesive is applied to bottom outer edge of cup holder, holding the coupling on a 45 degree angle, begin a bead of adhesive and as you rotate the coupling continue to apply and start inserting into the cup holder—usually 3-4 rotations is an even, complete application-apply a weight on top of the coupling during drying to assure completely seated.

Flexible Marine Adhesive-Bonded and remained stable in all temperatures. 9.99 Marine Fastener screws and snaps. #6 size with 1" long screw. Snaps installed 8" apart, 1" down and 1" from each side of 10"×10" pond liner flap. Screw are installed 1" from center of hole for pipe (easiest to install before pipe), 8" apart on center. Drill pilot hole and Dip each screw into marine adhesive before installing. This added step insures both grip and sealing of foam core from any moisture.

Phenoseal Caulk Adhesive-after trying several (many repelled cats from the smell) and reading the stable properties of this material at different temperatures found it best suited for the pipe installation. First a thin layer is spread onto the exposed foam completely sealing it, this ensures the foam core will remain dry, the 6" ID pipe is pushed through from the outside, clearing the interior edge. Adjust the pitch by advancing to top edge (we are building upside down-so this will become the bottom edge) further than the bottom edge. Both edges must fully clear the foam core (usually ½" top, ¼" bottom can vary). There will be excess sealant that pushes through during this and should be used to caulk the interior and exterior edge where the pipe meets to cooler (wipe away excess).

6⅝" Hole saw used to cut openings to accept pipe—this size accommodates the pipe for a snug fit. Cooler-All the shelters are currently being built using a Coleman Xtreme Cooler, 70 qt Larger (for double units). The placement of the cup holders, insulation properties and consistency makes them a perfect vehicle. The coolers are built to be used upside down since the bevel of the sides allows water to run off (when right side up water will run under the lid into cooler. Future builds could be done with a similar center that has the holes, feet molded, insulated and ready for the pipe (pipe could be molded as part of the unit too) leaving only snaps and hinges to be installed. The interior being white is also inviting to cats and choosing a color to blend into the surroundings is important.

Divider for double units-since these are essentially 2 shelters in one a solid center divider is needed. The material selected is 0.5" cutting board material (nontoxic and stable at all temperatures). Many of the larger coolers have a built-in channel to accept this divider that is fitted and scribed to the lid when closed to prevent a kitten from becoming trapped (building upside down-lid will be bottom). Each size required a different template to accomplish a snug fit. The units that do not have a channel require supports—22 mm Cable Tie mounts worked perfectly—one is placed bottom center (pilot hole and screw is dipped in marine adhesive) and one on either side about 3" down from top. this holds the divider securely. the shelter may be injection molded or 3d printed needing only the attachment of the marine screws/flaps, hinges and handles.

The coupling is a separate part and is dimensioned and adapted to fit over the door pipe snuggly and we in the future that clockwise/counterclockwise threading may be added to enable secure and easy modular conversions.

It should be understood, of course, that the foregoing relates to exemplary embodiments of the invention and that modifications may be made without departing from the spirit and scope of the invention as set forth in the following claims.

What is claimed is:

1. A method of manufacturing a shelter specifically adapted for a feral cat, the method comprising:
    providing a shelter body defining a compartment separate from an external environment;
    measuring a belly length of a cat;
    forming a conduit having a conduit length that is half of the belly length so that the cat can have their front legs in the compartment and their back legs in the external environment; and
    forming an opening in the shelter body for snugly receiving the conduit.

2. The method of claim 1, further comprising sliding the conduit in the opening so that a distal end of the conduit protrudes from the opening into the external environment an external distance between two to three inches, and wherein a proximal end of the conduit protrudes from the opening into the compartment an internal distance of between a quarter of an inch to half of an inch.

3. The method of claim 2, further comprising pitching the distal end downward toward a supporting surface of the shelter body by having an upper portion of the proximal end protrude a quarter of an inch into the compartment.

4. The method of claim 3, further comprising adding a second opening to the shelter body; and sliding a second conduit into the second opening, wherein the conduit and the second conduit are dimensionally similar.

5. The method of claim 4, further comprising determining a diameter for each conduit based on an average spread of the cat's whiskers.

6. The method of claim 5, further comprising adding third and fourth openings into the shelter body; and adding a divider separating the conduit and the second conduit from the third and fourth openings.

* * * * *